Patented Dec. 20, 1927.

1,653,227

UNITED STATES PATENT OFFICE.

JOHANNES PFLEGER, OF FRANKFORT-ON-THE-MAIN, AND AUGUST ALBERT, OF MUNICH, GERMANY.

PROCESS FOR THE MANUFACTURE OF NEW DERIVATIVES OF ORGANIC ARSENIC COMPOUNDS.

No Drawing. Application filed June 10, 1925, Serial No. 36,277, and in Germany June 19, 1923.

It is known that new derivatives of organic arsenic compounds can be produced by allowing hydrazin or its derivatives to act in the usual way upon such mixed aliphatic-aromatic arsenic compounds as contain one or more carbonyl groups in non-cyclic linkage.

We have now found that it is possible to obtain therapeutically very valuable condensation products of this kind by causing arsenic compounds of a mixed aliphatic-aromatic type which contain one or more carbonyl groups in non-cyclic linkage to react with such hydrazin derivatives of organic carbonyl compounds as are free from arsenic. If for example p-acetophenone arsinic acid and acetone semicarbazone are allowed to react with each other in accordance with this invention the surprising fact is ascertained that the hydrazin complex migrates from the compound free from arsenic to the one containing arsenic. In this way besides acetone a compound is obtained having the formula:

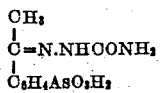

Hydrazin derivatives of organic carbonyl compounds which come into consideration for carrying this reaction into effect, are above all condensation products of ketones with hydrazin or derivatives of hydrazin which may contain one hydrazin group or more than one in the molecule. Semicarbazones are particularly useful.

Substances containing arsenic which are particularly suitable as starting materials for the reaction according to the present invention are, for example, arsenic compounds of a mixed aliphatic-aromatic character which contain one or more carbonyl groups in non-cyclic linkage and which can be produced for instance by the interaction of arsenites with ketones which are halogenized in the nucleus in accordance with the reaction described by G. Meyer (Ber. Deutsche Chem. Ges. vol. 16, p. 1440.) The definition of arsenic compounds of a mixed aliphatic-aromatic character which contain carbonyl groups comprise:

1. Acylated mononuclear or polynuclear or condensed aromatic or hydroaromatic compounds which are either substituted by one arsenic group only or which in addition to the arsenic group contain one or more other substituents such as for example OH-, $NH_2$-, $NH.CO.X$- (by X is to be understood H or any aromatic or aliphatic radicle substituted or not substituted), halogen, alkyl-, aldehyde- or keto-groups, carbonyl-sulphonic acid groups and the like of a carbo- or hetero-cyclic nature, in which the carbonyl-group is linked to the ring system and the acidyl residue may consist of the residue of any saturated or unsaturated aliphatic acid. This acid may also be formic acid or an oxy-aldehydo-, keto- or amino acid or the like;

2. Aliphatic ketones or aliphatic aldehydes with one or more aromatic residues, mononuclear, polynuclear or condensed nuclear which contain arsenic as only substituent in any combination whatever or which are substituted by other substituents beside arsenic (for example by OH-, $NH_2$-, halogen alkyl-, keto- or aldehydo- carbonyl-sulpho-groups or the like) of a carbocyclic or heterocyclic nature, it being immaterial whether one or more carbonyl groups are present.

The way in which the present invention may be carried into practice is illustrated by the following examples:

*Example 1.*—2,3 grammes of benzaldehyde arsinic acid are dissolved in approximately 20 cc. of alcohol and a solution of 1,2 grms. of acetone semicarbazone in 20 cc. of warm dilute alcohol is added. The mixture is allowed to stand for several hours. Soon well formed crystals make their appearance whilst the characteristic smell of acetone can be noticed. After aspiration and drying on a water bath 1,2 grm. of the product is obtained. The substance formed is the semicarbazone of the benzaldehyde arsinic acid; it is with difficulty soluble in hot and cold alcohol, insoluble in dilute acetic acid, soluble in a solution of sodium carbonate or acetate. From hot dilute alcohol of a strength of about 70 percent it crystallizes in colourless needles which do not fuse up to 270° centigrade. The reaction proceeds according to the following equation:

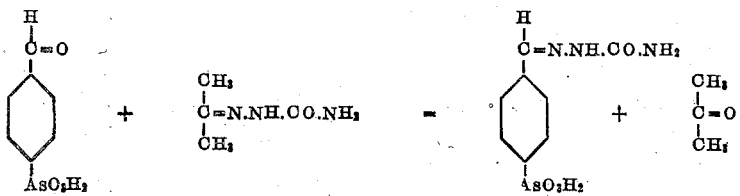

*Example 2.*—7,2 grms. of the acetonehydrazone are mixed with a solution of 100 grms. of acetophenone arsinic acid in 800 cc. of water and 52 grms. of anhydrous soda carbonate. The mixture is warmed to 70° C. and then allowed to stand over night. On the next day by the addition of 200 cc. of glacial acetic acid it is precipitated; the precipitate is then filtered off, washed with water and after having been dried as far as possible digested with boiling alcohol in order to remove the excess of the arsinic acid. The alcohol is coloured yellow as long as arsinic acid is still present. After having been boiled for the third time with alcohol the latter generally remains colourless. The hydrazone of the acetophenone arsinic acid is formed, which on being heated does not show any change up to 260° centigrade. The reaction proceeds according to the following equation:

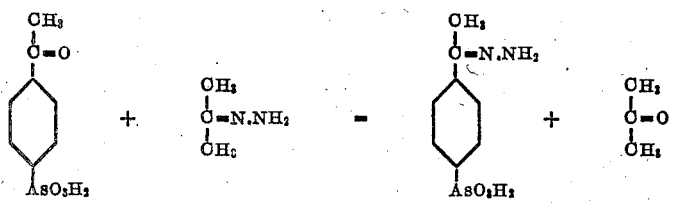

*Example 3.*—0,6 grm. of p-acetophenone arsinic acid is dissolved in 9 cc. of hot water and 0,3 grm. of acetone semicarbazone is added. From the clear solution a yellow crystalline substance separates out quickly. In order to complete the reaction the mixture is allowed to stand for several hours. It is then filtered off by suction. The product obtained shows the properties of the semicarbazone of the p-acetophenone arsinic acid. The reaction proceeds according to the following equation:

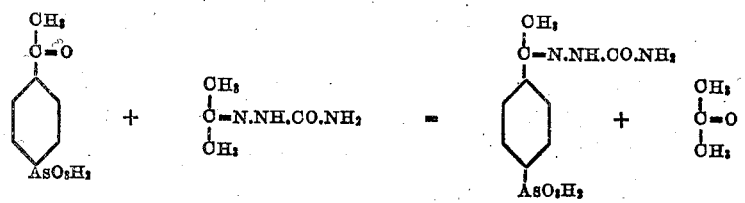

*Example 4.*—0,6 grm. of 1-acetophenone arsinic acid is dissolved in about 4 cc. of alcohol by warming and mixed with a hot solution of 0,5 grm. acetophenone semicarbazone in 10 cc. of alcohol. The mixture is heated on the water bath for several hours, whereon the semicarbazone of the acetophenone arsinic acid settles out in crystals. It is subsequently aspirated when still hot and dried in vacuo. The product shows the properties of the semicarbazone of the acetophenone arsinic acid. Instead of using an alcoholic solution the reaction may be brought about for instance in a faintly alkaline solution.

*Example 5.*—0,6 grm. p-acetophenone arsinic acid is dissolved in 4 cc. of alcohol and a solution of 0,5 grm. of the semicarbazone of the p-aminoacetophenone in 10 cc. of alcohol is added to the solution whilst hot. On warming the mixture on the water bath the separation of the crystalline semicarbazone of the p-acetophenone arsinic acid begins very soon.

The reaction on which the present invention is based may be used in certain cases with advantage for separating from highly impure solutions of carbonyl arsenic compounds the desired hydrazine derivative of the arsenic compounds in the pure state.

What we claim is:

1. A process for producing new derivatives of organic arsenic compounds which consists in causing organic arsenic compounds of a mixed aliphatic-aromatic type, which contain carbonyl groups in non-cyclic linkage to react with hydrazons of organic carbonyl compounds.

2. A process for producing new derivatives of organic arsenic compunds, which consists in causing organic arsenic compounds of a mixed aliphatic-aromatic nature which contain carbonyl groups in non-cyclic linkage to react with hydrazons of keto-compounds.

3. A process for producing new derivatives of organic arsenic compounds, which consists in causing organic arsenic compounds of a mixed aliphatic-aromatic nature which contain carbonyl groups in non-cyclic linkage to react with hydrazin derivatives of acetone.

Signed at Frankfort-on-Main in the Country of Hesse-Nassau and State of Prussia, Germany, this 20th day of May, A. D. 1925.

JOHANNES PFLEGER.
Prof. AUGUST ALBERT.